UNITED STATES PATENT OFFICE.

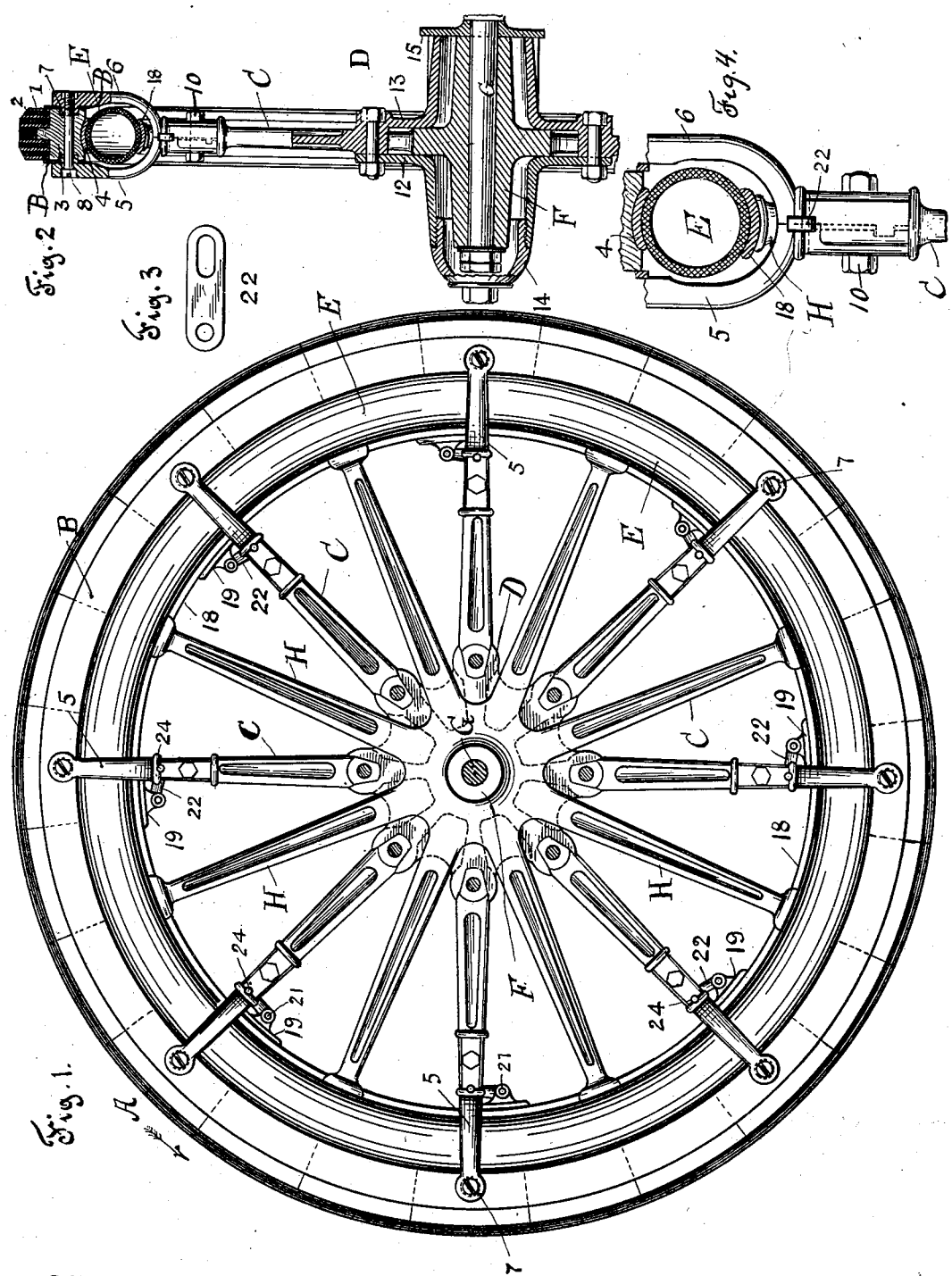

GEORGE S. LEE, OF HAWTHORNE, NEW JERSEY.

VEHICLE-WHEEL.

SPECIFICATION forming part of Letters Patent No. 713,226, dated November 11, 1902.

Application filed February 27, 1902. Serial No. 96,000. (No model.)

*To all whom it may concern:*

Be it known that I, GEORGE S. LEE, a citizen of the United States of America, and a resident of Hawthorne, in the county of Passaic and State of New Jersey, have invented certain new and useful Improvements in Vehicle-Wheels, of which the following is a specification.

This invention relates to improvements in vehicle-wheels.

The invention especially relates to that class of wheels which have a solid tire and a compressible pneumatic tube or equivalent resilient device, the solid tire having a curvilinear eccentric oscillation around the said pneumatic tube or equivalent device, whereby when the tire strikes an obstacle in the road the shock is taken up by the said pneumatic tire or device and is not transmitted to the axle or carriage.

Referring to the accompanying drawings to aid the description, Figure 1 is a side elevation, partly broken and with one half of the tire-hub D removed and showing the other parts in normal position. Fig. 2 is a broken section on the plane of the line 2 2 of Fig. 1. Fig. 3 is an enlarged detail of a link which connects the pneumatic-tube rim with the spokes of the solid tire. Fig. 4 is an enlarged broken detail of a solid-tire spoke and of the end of a link.

The solid tire A is preferably composed of layers of sheet-rubber 1 and leather 2 on a wooden felly 3, as described in my application filed in the United States Patent Office February 17, 1902, Serial No. 94,416, the said felly 3 being bolted between the annular side rims B B by a through-bolt 8, which passes through said rims B B and the yoke 5 6 of tire-spokes C, Fig. 2. Said yoke is preferably made in two pieces 5 and 6, respectively, each of which is provided with boss 7, which passes through a hole in said rims B B and into a recess in said felly 3, whereby the strength of the construction is increased. On the inner side of said felly 3 is a saddle 4, which normally rests all around on the pneumatic tube E. Said saddle 4 is advantageously used to strengthen said felly 3 and to provide a smooth surface to bear on the tube E, but may be dispensed with without affecting the operation of the parts. Said parts 5 and 6 of said yoke are bolted together at 10, the part 5 being separable from and the part 6 integral with the body of the spoke C. At its inner end each said tire-spoke C is bolted between the two parts 12 13 of the tire-hub D, 14 being a dust-guard cap on said tire-hub D, and 15 a dust-guard flange on the axle G. The bore of said tire-hub D is made sufficiently larger than the hub F of the pneumatic tube E to allow for the movements of the solid tire A, as hereinafter described. Said pneumatic tube E or any other suitable resilient device is carried on a rim 18, to which are fastened one or more shoes 19, which are pivotally connected with said tire-spokes C by links 22. The front end of each link 22 is pivoted at 21 between the ears of said shoes 19, and the rear end of each said link is preferably slotted and has both a sliding and a rotary connection with a pin 24 on the tire-spokes C, the parts 5 and 6 of said spokes being recessed to admit the end of said link 22, Fig. 4. Said links 22 are preferably arranged at an angle with the spokes C, as shown, to facilitate the movement of the tire A. Said rim 18 of the pneumatic tube E is carried by the tube-spokes H, the inner ends of which are flattened and pass with working fit between the flanges of the parts 12 13 of the solid-tire hub D, the inner ends of said spokes H being fastened in or said spokes being formed integral with the said tube-hub F, which is on the axle G. The flange at the inner ends of the spokes H being between the flanges 12 13, relative endwise movement of the hubs D F is prevented.

Supposing the vehicle to be running forward and the wheel to be revolving in the direction of the arrow in Fig. 1, then if the wheel encounters an obstacle in the road relative motion ensues between the solid tire A and the pneumatic tube B or equivalent elastic device, the effect of which is equivalent to the oscillation of the solid tire A around the pneumatic tube B in a curved path eccentric to the axle G, whereby the solid tire compresses the lower parts of the pneumatic tube, which thereby takes up the shock and prevents its reaching the axle G, the large bore of the hub D permitting of such relative curvilinear motion.

Now, having described my improvements, I claim as my invention—

1. The combination in a vehicle-wheel, of a hub provided with a resilient device and a second hub adapted to oscillate around the first-named hub and provided with a tire in contact with said resilient device.

2. The combination in a vehicle-wheel, of a hub provided with a pneumatic tube and a second hub provided with a tire in contact with the pneumatic tube and adapted to oscillate eccentrically to the first-named hub.

3. The combination in a vehicle-wheel, of a hub provided with a resilient device, and a second hub provided with a tire and adapted to oscillate eccentrically to the first-named hub, and devices adapted to limit the range of movement of the second hub.

4. The combination in a vehicle-wheel, of two hubs adapted to have relative eccentric motion, a pneumatic tube connected with one hub and a tire in contact with said tube connected with the other hub, and devices to limit the relative motion of said hubs.

5. The combination in a vehicle-wheel, of a hub on an axle, a second hub normally concentric thereto but adapted to oscillate eccentrically around said first-named hub, and means for preventing relative end motion of the hubs.

6. The combination in a vehicle-wheel, of a hub on an axle provided with a resilient device, a two-part hub adapted to have eccentric oscillation relative to the first-named hub and provided with a tire in contact with said resilient device, and a projection on the first-named hub engaged by the second hub to prevent relative endwise movement of the hubs.

7. The combination in a vehicle-wheel, of a hub provided with spokes and a pneumatic tube, a hub concentric to the first-named hub and provided with spokes and a tire in contact with said tube, and links adapted to limit the relative movement of the tire around the tube.

8. The combination in a vehicle-wheel, of a hub provided with spokes and a pneumatic tire, a second hub normally concentric to the first-named hub and provided with yoked spokes which span said tube and with a tire in contact with said tube, and links adapted to limit the relative motion of the tire and tube.

Signed at New York city this 19th day of February, 1902.

GEORGE S. LEE.

Witnesses:
HENRY V. BROWN,
D. WALTER BROWN.